(12) United States Patent
Sutivong et al.

(10) Patent No.: US 8,649,451 B2
(45) Date of Patent: *Feb. 11, 2014

(54) MC-CDMA MULTIPLEXING IN AN ORTHOGONAL UPLINK

(75) Inventors: Arak Sutivong, Bangkok (TH); Avneesh Agrawal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/090,220

(22) Filed: Apr. 19, 2011

(65) Prior Publication Data

US 2011/0235685 A1    Sep. 29, 2011

Related U.S. Application Data

(60) Division of application No. 12/889,131, filed on Sep. 23, 2010, which is a continuation of application No. 11/022,145, filed on Dec. 22, 2004.

(51) Int. Cl.
*H04L 27/28* (2006.01)
*H04J 11/00* (2006.01)

(52) U.S. Cl.
USPC .......................................... 375/260; 370/209

(58) Field of Classification Search
USPC ......... 375/132, 133, 135, 136, 138, 142, 146, 375/147, 150, 260, 262, 265, 343; 370/208–210
See application file for complete search history.

(56) References Cited

U.S. PATENT DOCUMENTS

| | | |
|---|---|---|
| 4,346,473 A | 8/1982 | Davis |
| 4,617,657 A | 10/1986 | Drynan et al. |
| 4,850,036 A | 7/1989 | Smith |
| 5,282,222 A | 1/1994 | Fattouche et al. |
| 5,408,496 A | 4/1995 | Ritz et al. |

(Continued)

FOREIGN PATENT DOCUMENTS

| | | |
|---|---|---|
| CN | 1187930 | 7/1998 |
| CN | 1254223 A | 5/2000 |

(Continued)

OTHER PUBLICATIONS

Cao, E. et al.: "Analysis of Two Receiver Schemes for Interleaved OFDMA Uplink," Conference Record of the Thirty-Sixth Asilomar Conference onSignals, Systems and Computers, 2002. Nov. 3, 2002, vol. 2, pp. 1818-1821.

(Continued)

*Primary Examiner* — Young T. Tse
(74) *Attorney, Agent, or Firm* — Eric Ho

(57) ABSTRACT

Techniques are provided to support multi-carrier code division multiple access (MC-CDMA) in an orthogonal uplink of a wireless communication system. A method of wireless multi-carrier communications comprises dividing sub-carriers on an uplink into non-overlapping groups, allocating a time-frequency block including a hopping duration and a non-overlapped group, respectively, assigning a different set of orthogonal codes to each user, spreading data (or pilot) symbols of each user over the allocated time-frequency block, wherein the data (or pilot) symbols of each user are spread using the different set of orthogonal codes assigned to each user, mapping each data (or pilot) symbol to a modulation symbol in the time-frequency block, generating an orthogonal waveform based on the mapped symbols, and transmitting the orthogonal waveform.

32 Claims, 2 Drawing Sheets

(56) References Cited

U.S. PATENT DOCUMENTS

| | | |
|---|---|---|
| 5,416,780 A | 5/1995 | Patel |
| 5,511,233 A | 4/1996 | Otten |
| 5,519,130 A | 5/1996 | Byrom et al. |
| 5,519,730 A | 5/1996 | Jasper et al. |
| 5,694,389 A | 12/1997 | Seki et al. |
| 5,732,351 A | 3/1998 | Olds et al. |
| 5,822,700 A | 10/1998 | Hult et al. |
| 5,867,478 A | 2/1999 | Baum et al. |
| 5,889,759 A | 3/1999 | McGibney |
| 5,920,547 A | 7/1999 | Werth |
| 5,995,494 A | 11/1999 | Horikawa |
| 6,005,852 A | 12/1999 | Kokko et al. |
| 6,021,124 A | 2/2000 | Haartsen |
| 6,052,377 A | 4/2000 | Ohmi et al. |
| 6,097,711 A | 8/2000 | Okawa et al. |
| 6,104,926 A | 8/2000 | Hogg et al. |
| 6,105,064 A | 8/2000 | Davis et al. |
| 6,134,434 A | 10/2000 | Krishnamurthi et al. |
| 6,141,550 A | 10/2000 | Ayabe et al. |
| 6,157,839 A | 12/2000 | Cerwall et al. |
| 6,172,971 B1 | 1/2001 | Kim |
| 6,173,016 B1 | 1/2001 | Suzuki |
| 6,188,717 B1 | 2/2001 | Kaiser et al. |
| 6,222,828 B1 | 4/2001 | Ohlson et al. |
| 6,263,205 B1 | 7/2001 | Yamaura et al. |
| 6,285,665 B1 | 9/2001 | Chuah |
| 6,333,937 B1 | 12/2001 | Ryan |
| 6,347,091 B1 | 2/2002 | Wallentin et al. |
| 6,367,045 B1 | 4/2002 | Khan et al. |
| 6,369,758 B1 | 4/2002 | Zhang |
| 6,377,587 B1 | 4/2002 | Grivna |
| 6,377,809 B1 | 4/2002 | Rezaiifar et al. |
| 6,430,412 B1 | 8/2002 | Hogg et al. |
| 6,430,724 B1 | 8/2002 | Laneman et al. |
| 6,447,210 B1 | 9/2002 | Coombs |
| 6,449,245 B1 | 9/2002 | Ikeda et al. |
| 6,466,591 B1 | 10/2002 | See et al. |
| 6,473,393 B1 | 10/2002 | Ariyavisitakul et al. |
| 6,473,467 B1 | 10/2002 | Wallace et al. |
| 6,477,210 B2 | 11/2002 | Chuang et al. |
| 6,487,235 B2 | 11/2002 | Hoole |
| 6,487,252 B1 | 11/2002 | Kleider et al. |
| 6,505,253 B1 | 1/2003 | Chiu et al. |
| 6,515,997 B1 | 2/2003 | Feltner et al. |
| 6,522,886 B1 | 2/2003 | Youngs et al. |
| 6,532,227 B1 | 3/2003 | Leppisaari et al. |
| 6,532,256 B2 | 3/2003 | Miller |
| 6,535,715 B2 | 3/2003 | Dapper et al. |
| 6,545,997 B1 | 4/2003 | Bohnke et al. |
| 6,549,561 B2 | 4/2003 | Crawford |
| 6,563,858 B1 | 5/2003 | Fakatselis et al. |
| 6,567,374 B1 | 5/2003 | Bohnke et al. |
| 6,567,397 B1 | 5/2003 | Campana, Jr. et al. |
| 6,594,320 B1 | 7/2003 | Sayeed |
| 6,597,680 B1 | 7/2003 | Lindskog et al. |
| 6,597,745 B1 | 7/2003 | Dowling |
| 6,597,918 B1 | 7/2003 | Kim |
| 6,601,207 B1 | 7/2003 | Vanttinen |
| 6,603,801 B1 | 8/2003 | Andren et al. |
| 6,618,454 B1 | 9/2003 | Agrawal et al. |
| 6,633,616 B2 | 10/2003 | Crawford |
| 6,636,568 B2 | 10/2003 | Kadous |
| 6,643,281 B1 | 11/2003 | Ryan |
| 6,654,429 B1 | 11/2003 | Li |
| 6,658,619 B1 | 12/2003 | Chen |
| 6,661,832 B1 | 12/2003 | Sindhushayana et al. |
| 6,665,309 B2 | 12/2003 | Hsu et al. |
| 6,674,792 B1 | 1/2004 | Sugita |
| 6,697,347 B2 | 2/2004 | Ostman et al. |
| 6,700,865 B1 | 3/2004 | Yamamoto et al. |
| 6,724,813 B1 | 4/2004 | Jamal et al. |
| 6,731,614 B1 | 5/2004 | Ohlson et al. |
| 6,741,634 B1 | 5/2004 | Kim et al. |
| 6,751,187 B2 | 6/2004 | Walton et al. |
| 6,801,564 B2 | 10/2004 | Rouphael et al. |
| 6,813,478 B2 | 11/2004 | Glazko et al. |
| 6,876,694 B2 | 4/2005 | Komatsu |
| 6,878,694 B2 | 4/2005 | Doshi et al. |
| 6,885,645 B2 | 4/2005 | Ryan et al. |
| 6,888,805 B2 | 5/2005 | Bender et al. |
| 6,907,246 B2 | 6/2005 | Xu et al. |
| 6,909,761 B2 | 6/2005 | Kloos et al. |
| 6,928,062 B2 | 8/2005 | Krishnan et al. |
| 6,928,065 B2 | 8/2005 | Logalbo et al. |
| 6,975,647 B2 | 12/2005 | Neale et al. |
| 6,977,974 B1 | 12/2005 | Geraniotis et al. |
| 6,990,142 B2 | 1/2006 | Chappaz |
| 6,996,195 B2 | 2/2006 | Kadous |
| 6,996,401 B2 | 2/2006 | Agin |
| 7,009,960 B2 | 3/2006 | Ho |
| 7,020,110 B2 | 3/2006 | Walton et al. |
| 7,027,429 B2 | 4/2006 | Laroia et al. |
| 7,027,523 B2 | 4/2006 | Jalali et al. |
| 7,039,001 B2 | 5/2006 | Krishnan et al. |
| 7,039,004 B2 | 5/2006 | Sun et al. |
| 7,042,429 B2 | 5/2006 | Miyazawa et al. |
| 7,042,857 B2 | 5/2006 | Krishnan et al. |
| 7,042,869 B1 | 5/2006 | Bender |
| 7,046,651 B2 | 5/2006 | Terry |
| 7,054,902 B2 | 5/2006 | Toporek et al. |
| 7,058,134 B2 | 6/2006 | Sampath |
| 7,061,915 B2 | 6/2006 | Seidel et al. |
| 7,061,916 B2 | 6/2006 | Herron et al. |
| 7,062,276 B2 | 6/2006 | Xu et al. |
| 7,068,703 B2 | 6/2006 | Maric |
| 7,072,413 B2 | 7/2006 | Walton et al. |
| 7,089,024 B2 | 8/2006 | Kim et al. |
| 7,092,459 B2 | 8/2006 | Sendonaris |
| 7,099,296 B2 | 8/2006 | Belcea |
| 7,099,299 B2 | 8/2006 | Liang et al. |
| 7,099,622 B2 | 8/2006 | Meyer et al. |
| 7,103,823 B2 | 9/2006 | Nemawarkar et al. |
| 7,127,012 B2 | 10/2006 | Han et al. |
| 7,133,460 B2 | 11/2006 | Bae et al. |
| 7,139,320 B1 | 11/2006 | Singh et al. |
| 7,177,297 B2 | 2/2007 | Agrawal et al. |
| 7,181,170 B2 | 2/2007 | Love et al. |
| 7,181,666 B2 | 2/2007 | Grob et al. |
| 7,254,158 B2 | 8/2007 | Agrawal |
| 7,280,467 B2 | 10/2007 | Smee et al. |
| 7,283,559 B2 | 10/2007 | Cho et al. |
| 7,310,336 B2 | 12/2007 | Malkamaki |
| 7,320,043 B2 | 1/2008 | Shatas et al. |
| 7,366,272 B2 | 4/2008 | Kim et al. |
| 7,376,422 B2 | 5/2008 | Yagihashi |
| 7,411,895 B2 | 8/2008 | Laroia et al. |
| 7,430,253 B2 | 9/2008 | Olson et al. |
| 7,450,587 B2 | 11/2008 | Gruhn et al. |
| 7,453,849 B2 | 11/2008 | Teague et al. |
| 7,463,576 B2 | 12/2008 | Krishnan et al. |
| 7,464,166 B2 | 12/2008 | Larsson et al. |
| 7,474,686 B2 | 1/2009 | Ho |
| 7,519,016 B2 | 4/2009 | Lee et al. |
| 7,551,546 B2 | 6/2009 | Ma et al. |
| 7,630,403 B2 | 12/2009 | Ho et al. |
| 7,631,247 B2 | 12/2009 | Petrovic et al. |
| 7,778,337 B2 | 8/2010 | Tong et al. |
| 2002/0034161 A1 | 3/2002 | Deneire et al. |
| 2002/0034172 A1 | 3/2002 | Ho |
| 2002/0041635 A1 | 4/2002 | Ma et al. |
| 2002/0044540 A1 | 4/2002 | Mottier et al. |
| 2002/0080902 A1 | 6/2002 | Kim et al. |
| 2002/0097697 A1 | 7/2002 | Bae et al. |
| 2002/0119784 A1 | 8/2002 | Agin |
| 2002/0122431 A1 | 9/2002 | Cho et al. |
| 2002/0136273 A1 | 9/2002 | Hoole |
| 2002/0145968 A1 | 10/2002 | Zhang et al. |
| 2002/0145970 A1 | 10/2002 | Han et al. |
| 2002/0152315 A1 | 10/2002 | Kagan et al. |
| 2002/0160781 A1 | 10/2002 | Bark et al. |
| 2002/0196731 A1 | 12/2002 | Laroia et al. |
| 2003/0012174 A1 | 1/2003 | Bender et al. |
| 2003/0079022 A1 | 4/2003 | Toporek et al. |
| 2003/0123481 A1 | 7/2003 | Neale et al. |

(56) References Cited

U.S. PATENT DOCUMENTS

| | | |
|---|---|---|
| 2003/0135640 A1 | 7/2003 | Ho et al. |
| 2003/0161343 A1 | 8/2003 | Ghosh |
| 2003/0165131 A1 | 9/2003 | Liang et al. |
| 2003/0169769 A1 | 9/2003 | Ho et al. |
| 2003/0174662 A1 | 9/2003 | Malkamaki |
| 2003/0174700 A1 | 9/2003 | Ofek et al. |
| 2003/0214906 A1 | 11/2003 | Hu et al. |
| 2003/0214930 A1 | 11/2003 | Fischer |
| 2003/0227898 A1 | 12/2003 | Logalbo et al. |
| 2003/0228865 A1 | 12/2003 | Terry |
| 2004/0001429 A1 | 1/2004 | Ma et al. |
| 2004/0047298 A1 | 3/2004 | Yook et al. |
| 2004/0062206 A1 | 4/2004 | Soong et al. |
| 2004/0082336 A1 | 4/2004 | Jami et al. |
| 2004/0082356 A1 | 4/2004 | Walton et al. |
| 2004/0095903 A1 | 5/2004 | Ryan et al. |
| 2004/0114552 A1 | 6/2004 | Lim et al. |
| 2004/0114566 A1 | 6/2004 | Lim et al. |
| 2004/0114618 A1* | 6/2004 | Tong et al. ............... 370/431 |
| 2004/0116125 A1 | 6/2004 | Terry |
| 2004/0120304 A1 | 6/2004 | Kloos et al. |
| 2004/0136445 A1 | 7/2004 | Olson et al. |
| 2004/0137863 A1 | 7/2004 | Walton et al. |
| 2004/0137943 A1 | 7/2004 | Tseng |
| 2004/0170439 A1 | 9/2004 | Hiironen |
| 2004/0184471 A1 | 9/2004 | Chuah et al. |
| 2004/0196871 A1 | 10/2004 | Terry |
| 2004/0205105 A1 | 10/2004 | Larsson et al. |
| 2004/0213278 A1 | 10/2004 | Pullen et al. |
| 2004/0228267 A1* | 11/2004 | Agrawal et al. ........... 370/203 |
| 2004/0229615 A1* | 11/2004 | Agrawal ................... 455/436 |
| 2004/0235472 A1 | 11/2004 | Fujishima et al. |
| 2004/0253968 A1 | 12/2004 | Chang et al. |
| 2004/0258134 A1 | 12/2004 | Cho et al. |
| 2005/0002355 A1 | 1/2005 | Takano |
| 2005/0002369 A1 | 1/2005 | Ro et al. |
| 2005/0013263 A1 | 1/2005 | Kim et al. |
| 2005/0030976 A1 | 2/2005 | Wentink |
| 2005/0034049 A1 | 2/2005 | Nemawarkar et al. |
| 2005/0044439 A1 | 2/2005 | Shatas et al. |
| 2005/0069022 A1 | 3/2005 | Agrawal |
| 2005/0163194 A1* | 7/2005 | Gore et al. ................ 375/132 |
| 2005/0165949 A1 | 7/2005 | Teague |
| 2005/0174931 A1* | 8/2005 | Krishnamoorthi ......... 370/208 |
| 2005/0190868 A1* | 9/2005 | Khandekar et al. ....... 375/346 |
| 2005/0202784 A1 | 9/2005 | Xu et al. |
| 2005/0254555 A1 | 11/2005 | Teague |
| 2005/0272432 A1 | 12/2005 | Ji et al. |
| 2005/0281242 A1 | 12/2005 | Sutivong et al. |
| 2005/0281290 A1 | 12/2005 | Khandekar et al. |
| 2006/0034163 A1 | 2/2006 | Gore et al. |
| 2006/0034173 A1 | 2/2006 | Teague et al. |
| 2006/0045001 A1 | 3/2006 | Jalali |
| 2006/0114848 A1 | 6/2006 | Eberle et al. |
| 2006/0133308 A1 | 6/2006 | Madan |
| 2006/0133522 A1 | 6/2006 | Sutivong et al. |
| 2006/0153239 A1 | 7/2006 | Julian et al. |
| 2006/0164993 A1 | 7/2006 | Teague et al. |
| 2006/0203932 A1 | 9/2006 | Palanki et al. |
| 2006/0209927 A1 | 9/2006 | Khandekar et al. |
| 2006/0218302 A1 | 9/2006 | Chia et al. |
| 2006/0221810 A1 | 10/2006 | Vrcelj et al. |
| 2006/0279435 A1 | 12/2006 | Krishnan et al. |
| 2007/0206623 A1 | 9/2007 | Tiedemann et al. |
| 2007/0211790 A1 | 9/2007 | Agrawal et al. |
| 2008/0075184 A1 | 3/2008 | Muharemovic et al. |
| 2008/0137603 A1 | 6/2008 | Teague et al. |
| 2008/0137652 A1 | 6/2008 | Herrmann et al. |
| 2009/0245421 A1 | 10/2009 | Montojo et al. |
| 2010/0002570 A9 | 1/2010 | Walton et al. |
| 2010/0034164 A1 | 2/2010 | Ho et al. |
| 2010/0182911 A1 | 7/2010 | Pullen et al. |
| 2011/0064039 A1 | 3/2011 | Sutivong et al. |
| 2011/0145584 A1 | 6/2011 | Coburn et al. |
| 2011/0282999 A1 | 11/2011 | Teague et al. |
| 2012/0087336 A1 | 4/2012 | Sutivong et al. |

FOREIGN PATENT DOCUMENTS

| | | |
|---|---|---|
| CN | 1345518 A | 4/2002 |
| CN | 1394394 A | 1/2003 |
| DE | 19701011 C1 | 6/1998 |
| DE | 19747369 A1 | 5/1999 |
| DE | 10010870 | 11/2000 |
| EP | 0658028 A2 | 6/1995 |
| EP | 0768806 A2 | 4/1997 |
| EP | 0917316 A2 | 5/1999 |
| EP | 1039683 | 3/2002 |
| EP | 1043861 | 6/2002 |
| EP | 1265411 | 12/2002 |
| EP | 1286491 | 2/2003 |
| EP | 1432261 A1 | 6/2004 |
| EP | 1513272 A1 | 3/2005 |
| EP | 1919152 A2 | 5/2008 |
| GB | 2350753 | 12/2003 |
| JP | 04127738 | 4/1992 |
| JP | 04367135 | 12/1992 |
| JP | 07327248 | 12/1995 |
| JP | 09233047 | 9/1997 |
| JP | 9266466 | 10/1997 |
| JP | 10336159 A | 12/1998 |
| JP | 11113049 | 4/1999 |
| JP | 11261623 A | 9/1999 |
| JP | 11331121 A | 11/1999 |
| JP | 11346203 A | 12/1999 |
| JP | 2000013353 | 1/2000 |
| JP | 2000111631 A | 4/2000 |
| JP | 2000504908 T | 4/2000 |
| JP | 2000201134 A | 7/2000 |
| JP | 2000252947 | 9/2000 |
| JP | 2000278207 A | 10/2000 |
| JP | 2001036497 A | 2/2001 |
| JP | 2002111624 A | 4/2002 |
| JP | 2002111631 A | 4/2002 |
| JP | 2002141837 A | 5/2002 |
| JP | 2002152167 A | 5/2002 |
| JP | 2002152169 A | 5/2002 |
| JP | 2002158631 A | 5/2002 |
| JP | 2002154368 A | 5/2002 |
| JP | 2002164867 A | 6/2002 |
| JP | 2003060645 A | 2/2003 |
| JP | 2003060655 | 2/2003 |
| JP | 2003078565 | 3/2003 |
| JP | 2003218826 A | 7/2003 |
| JP | 2003520499 T | 7/2003 |
| JP | 2003528527 A | 9/2003 |
| JP | 2003339072 A | 11/2003 |
| JP | 2004007353 A | 1/2004 |
| JP | 2004159345 A | 6/2004 |
| JP | 2004529524 T | 9/2004 |
| JP | 2004312291 A | 11/2004 |
| JP | 2004537875 A | 12/2004 |
| JP | 2005508103 T | 3/2005 |
| JP | 2005512458 T | 4/2005 |
| JP | 2005536103 T | 11/2005 |
| JP | 20060505229 | 2/2006 |
| KR | 030017401 | 3/2003 |
| RU | 2111619 | 5/1998 |
| RU | 2150174 | 5/2000 |
| RU | 2180159 C2 | 2/2002 |
| RU | 2213430 | 9/2003 |
| RU | 2335852 C2 | 10/2008 |
| TW | 508922 | 11/2002 |
| WO | WO9210890 | 6/1992 |
| WO | WO9408432 | 4/1994 |
| WO | WO9730526 A1 | 8/1997 |
| WO | WO9814026 | 4/1998 |
| WO | WO9914878 | 3/1999 |
| WO | WO9943114 A1 | 8/1999 |
| WO | WO9944316 A1 | 9/1999 |
| WO | WO9966748 A1 | 12/1999 |
| WO | WO0161902 | 8/2001 |

(56) References Cited

FOREIGN PATENT DOCUMENTS

| | | |
|---|---|---|
| WO | WO0176110 A2 | 10/2001 |
| WO | WO023556 A2 | 1/2002 |
| WO | WO0237887 A1 | 5/2002 |
| WO | WO0241548 A1 | 5/2002 |
| WO | WO0249305 A2 | 6/2002 |
| WO | WO0249306 | 6/2002 |
| WO | 02073831 A1 | 9/2002 |
| WO | WO02093832 | 11/2002 |
| WO | WO03019852 A1 | 3/2003 |
| WO | WO03021829 A1 | 3/2003 |
| WO | WO03034645 | 4/2003 |
| WO | WO2004015946 A1 | 2/2004 |
| WO | WO2004040813 | 5/2004 |
| WO | WO2004073219 A1 | 8/2004 |
| WO | WO2004079937 A2 | 9/2004 |
| WO | WO2005074184 | 8/2005 |
| WO | WO2006022876 | 3/2006 |

OTHER PUBLICATIONS

Elkashlan M. et al, Performance of Frequency-Hopping Multicarrier CDMA on a Uplink with Conference Proceedings, San Francisco, CA Dec. 1-5, 2003, IEEE Global Telecommunications Conference, NY, NY, IEEE, US, vol. 7 of 7, Dec. 1, 2003, pp. 3407-3411.
European Search Report—EP09173835, The Hague, Feb. 4, 2010.
Gromakov, Ju.A., "Standards and Systems of Mobile Communications (Mobile Radio Communication Standards and Systems)" Moscow: Mobilnye Telesistemy—Eko Trands, 1997, pp. 59-61.
Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
IEEE Communications Magazine, Apr. 2002, David Falconer et al., Frequency Domain Equalization for Single-Carrier Broadband Wireless Systems, pp. 58-66.
International Preliminary Examination Report—PCT/US03/34507—International Preliminary Examining Authority—IPEA/US—May 18, 2005.
International Preliminary Examination Report—PCT/US04/14453—International Preliminary Examining Authority—IPEA/U—Jun. 8, 2006.
International Preliminary Report on Patentability—PCT/US2005/002545—International Preliminary Examining Authority—IPEA/US—Aug. 2, 2006.
International Preliminary Report on Patentability—PCT/US05/046741—International Search Authority—The International Bureau of WIPO, Switzerland, Jun. 26, 2007.
International Search Report—PCT/US03/34507—International Search Authority—ISA/US—Jun. 3, 2004.
International Search Report—PCT/US04/14453—International Search Authority—ISA/US—Jan. 11, 2006.
International Search Report—PCT/US2005/002545—International Search Authority—European Patent Office—Oct. 11, 2005.
International Search Report and Written Opinion—PCT/US2005/046804, International Search Authority—European Patent Office—Jul. 17, 2006.
International Search Report—PCT/US03/034506—International Search Authority—US, Apr. 9, 2004.
International Search Report—PCT/US05/046741—International Search Authority—European Patent Office, May 12, 2006.
International Search Report—PCT/US2005/046806—International Search Authority—European Patent Office May 2, 2006.
Kapoor, S. et al., "Pilot assisted synchronization for wireless OFDM systems over fast time varying fading channels," Proceedings of the 48th Vehicular Technology Conference (VTC'98). Ottawa, Canada, May 18, 1998, vol. 3, pp. 2077-2080.
Sudarshan Roa, Subramanian Vasudevan Resource Allocation and Fairness for downlink shared Data channels, Mar. 16-20, 2003, 2003 IEEE. Wireless Communication and Networking, 2003 WCNC 2003,pp. 1049-1054.
Supplemental European Search Report—EP04751717, European Search Authority—The Hague—May 21, 2008.
Taiwanese Search report—092130051—TIPO—May 19, 2010.
Technical Specification Group Radio Access Network: "3GPP TR25. 848 V4.0.0 Physical Layer Aspects of UTRA High Speed Downlink Packet Access (Release 4)" 3GPP TR 25.848 V4.0.0, Mar. 2001, pp. 1-89, XP002189517.
Tonello A.M. et al. "An Asynchronous Multitone Multiuser Air Interface for High-speed Uplink Communications," Vehicular Technology Conference, 2003, VTC 2003 Fall, 2003 IEEE 58th, Orlando, FL, US Oct. 6-9, 2003, Piscataway, NJ, US, IEEE, US.
Van De Beek J-J et al: "On Channel Estimation in OFDM Systems" Proceedings of the Vehicular Technology Conference. Chicago, Jul. 25-28, 1995, New York, IEEE, US, vol. 2 Conf. 45, Jul. 25, 1995, pp. 815-819, XP000551647 ISBN: 0-7803-2743-8 p. 816, left-hand column, line 20—p. 817, left-hand column, line 23 p. 818, right-hand column, line 3—line 20 figure 5.
Van der Beek, J-J et al.: "A Time and Frequency Synchronization Scheme for Multiuser OFDM," IEEE Journal of Selected Areas in Communications, vol. 17, No. 11, pp. 1900-1914, Nov. 1, 1999.
Written Opinion—PCT/US04/14453—International Search Authority—ISA/US—Jan. 11, 2006.
Written Opinion—PCT/US2005/002545—International Search Authority—European Patent Office—Oct. 11, 2005.
Written Opinion—PCT/US2005/046806—International Search Authority—European Patent Office—May 2, 2006.
Written Opinion-PCT/US05/046741—International Search Authority—European Patent Office, Munich, May 12, 2006.
Yasunori, M. et al.: "A Study on Adaptive Uplink Resource Control Scheme for Asymmetric Packet Radio Communication Systems using OFDMA/TDD Technique," IEICE Technical Report, vol. 100, No. 435 RCS 2000-172 (Abstract), pp. 63-70, Nov. 10, 2000.
Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.
Taiwan Search Report—TW094145927—TIPO—Dec. 23, 2011.
Zhao et al., "A novel channel estimation method for OFDM mobile communication systems based on pilot signals and transform-domain processing" Vehicular Technology Conference, 1997, IEEE 47TH Phoenix, AZ, USA May 4-7, 1997, New York, NY, USA, IEEE, US, vol. 3, May 4, 1997, pp. 2089-2093, XP010229166 ISBN: 0-7803-3659-3.
Miller, L. et al., "Cumulative acknowledgement multicast repetition policy for wireless LANs or ad hoc network clusters," IEEE, Wireless Communication Technologies Group National Institute of Standards and Technology, Maryland Gaithersburg, pp. 3403-3407, (2002).
Miyoshi, M. et al.,"Performance Improvement of TCP in wireless cellular network based acknowledgement control", Department of Infomatics and Mathematical Science, Graduate School of Engineering Science, Osaka University, Japan, Proceedings of the 7th Asia Pacific, pp. 1-15, (2001).
Cai, X., et al., "Group-orthogonal multi-carrier CDMA", Military Communications Conference. MILCOM 2002. Proceedings. Anaheim, CA, Oct. 7-10, 2002; [IEEE Military Communications Conference], New York, NY: IEEE; US, vol. 1, 7 Oct. 7, 2002, pp. 596-601, XP010632171, DOI: 10.1109/MILCOM.2002.1180511 ISBN: 978-0-7803-7625-0, Sections I-III.
European Search Report—EP11164567—Search Authority—Munich—Jul. 1, 2013.
Xu, Y., et al., "Group-orthogonal OFDMA in fast time-varying frequency-selective fading environments", 2004 IEEE 60TH Vehicular Technology Conference. VTC2004-Fall (IEEE CAT. No. 04CH37575) IEEE Piscataway, NJ, USA, IEEE, vol. 1, Sep. 26, 2004, pp. 488-492, XP010788423, DOI: 10.1109/VETECF.2004. 1400054 ISBN: 978-0-7803-8521-4, abstract, Sections I and III.

* cited by examiner

MC-CDMA MULTIPLEXING IN AN ORTHOGONAL UPLINK

CROSS-REFERENCE TO RELATED APPLICATION

Claims of Priority under 35 U.S.C. §119 and §120

The present application for patent is a Divisional application to patent application entitled "MC-CDMA Multiplexing in an Orthogonal Uplink", Ser. No. 12/889,131, filed Sep. 23, 2010 which is a continuation of patent application entitled "MC-CDMA Multiplexing in an Orthogonal Uplink", Ser. No. 11/022,145, filed Dec. 22, 2004.

Reference to Co-Pending Applications for Patent

The present application is related to the following co-pending U.S. patent applications: "Fast Frequency Hopping With a Code Division Multiplexed Pilot in an OFDMA System," patent application Ser. No. 10/726,944, filed Dec. 3, 2003, now U.S. Pat. No. 7,177,297; and "Fast Frequency Hopping With a Code Division Multiplexed Pilot in an OFDMA System," patent application Ser. No. 60/470,107 filed on May 12, 2003, expired, assigned to the assignee hereof, and expressly incorporated by reference herein.

BACKGROUND

1. Field

The present invention relates generally to communication, and more specifically to techniques for supporting multi-carrier code division multiple access (MC-CDMA) in an orthogonal uplink of a wireless communication system.

2. Background

In a frequency hopping spread spectrum (FHSS) communication system, data is transmitted on different frequency subbands or sub-carriers in different time intervals, which are also referred to as "hop periods". These frequency subbands may be provided by orthogonal frequency division multiplexing (OFDM), other multi-carrier modulation techniques, or some other constructs. With FHSS, the data transmission hops from subband to subband in a pseudo-random manner. This hopping provides frequency diversity and allows the data transmission to better withstand deleterious path effects such as narrow-band interference, jamming, fading, and so on.

An OFDMA system utilizes OFDM and can support multiple users simultaneously. For a frequency hopping OFDMA system, data for each user is transmitted using a specific frequency hopping (FH) sequence assigned to the user. The FH sequence indicates the specific subband to use for data transmission in each hop period. Multiple data transmissions for multiple users may be sent simultaneously using different FH sequences. These FH sequences are defined to be orthogonal to one another so that only one data transmission uses each subband in each hop period. By using orthogonal FH sequences, intra-cell interference is avoided, and the multiple data transmissions do not interfere with one another while enjoying the benefits of frequency diversity.

SUMMARY

Techniques are provided herein to support MC-CDMA multiplexing in an orthogonal uplink of a wireless communication system.

In an aspect, a method of wireless multi-carrier communications, comprises dividing sub-carriers on an uplink into non-overlapping groups, allocating at least one time-frequency block, each time-frequency block having a hopping duration and a non-overlapped group, assigning a different set of orthogonal codes to each user, spreading symbols of each user over the allocated at least one time-frequency block, wherein the symbols of each user are spread using the different set of orthogonal codes assigned to each user, mapping each symbol to a modulation symbol in the at least one time-frequency block, generating an orthogonal waveform based on the mapped symbols; and transmitting the orthogonal waveform.

In an aspect, the orthogonal waveform generated is an orthogonal frequency division multiple (OFDM) waveform. In another aspect, the orthogonal waveform generated is an orthogonal frequency division multiple access (OFDMA) waveform.

In an aspect, an apparatus for wireless multi-carrier communications comprises means for dividing sub-carriers on an uplink into non-overlapping groups, means for allocating at least one time-frequency block, each time-frequency block having a hopping duration and a non-overlapped group, means for assigning a different set of orthogonal codes to each user, means for spreading symbols of each user over the allocated at least one time-frequency block, wherein the symbols of each user are spread using the different set of orthogonal codes assigned to each user, means for mapping each symbol to a modulation symbol in the at least one time-frequency block, means for generating an orthogonal waveform based on the mapped symbols, and means for transmitting the orthogonal waveform.

In yet another aspect, a computer readable media embodying a method for wireless multi-carrier communications comprises dividing sub-carriers on an uplink into non-overlapping groups, allocating at least one time-frequency block, each time-frequency block having a hopping duration and a non-overlapped group, assigning a different set of orthogonal codes to each user, spreading symbols of each user over the allocated at least one time-frequency block, wherein the symbols of each user are spread using the different set of orthogonal codes assigned to each user, mapping each symbol to a modulation symbol in the at least one time-frequency block, generating an orthogonal waveform based on the mapped symbols, and transmitting the orthogonal waveform.

In still yet another aspect, an apparatus for wireless multi-carrier communications comprises a controller, a processor, and a transmitter. The controller is operative to divide sub-carriers on an uplink into non-overlapping groups, allocate at least one time-frequency block, each time-frequency block having a hopping duration and a non-overlapped group, and assign a different set of orthogonal codes to each user. The processor is operative to spread symbols of each user over the allocated at least one time-frequency block, wherein the symbols of each user are spread using the different set of orthogonal codes assigned to each user and map each symbol to a modulation symbol in the at least one time-frequency block. The transmitter is operative to generate an orthogonal waveform based on the mapped symbols, and transmit the orthogonal waveform.

In an aspect, a receiver in a wireless multi-carrier communications system comprises an antenna for receiving an orthogonal waveform, a demodulator for demodulating the orthogonal waveform, thereby creating spread symbols, a processor for determining a time-frequency block from the spread symbols, and a de-spreader for despreading the spread symbols in the time-frequency block using an orthogonal code for a user.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
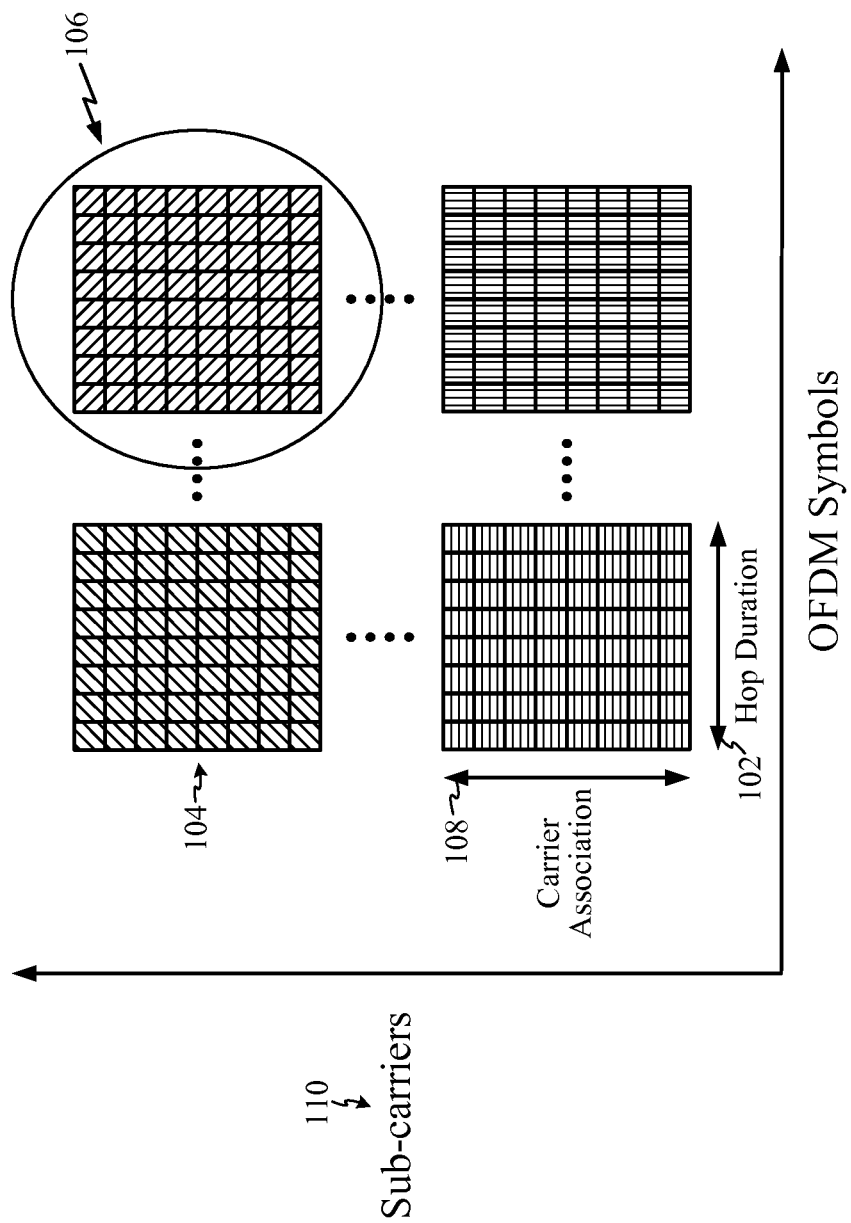
FIG. 1 illustrates the concept of MC-CDMA in the context of FH-OFDMA in accordance with an embodiment.

The word "exemplary" is used herein to mean "serving as an example, instance, or illustration." Any embodiment or design described herein as "exemplary" is not necessarily to be construed as preferred or advantageous over other embodiments or designs.

An OFDMA system may be deployed with multiple cells, where a cell typically refers to a base station and/or its coverage area. A data transmission on a given subband in one cell acts as interference to another data transmission on the same subband in a neighboring cell. To randomize inter-cell interference, the FH sequences for each cell are typically defined to be pseudo-random with respect to the FH sequences for neighboring cells. By using pseudo-random FH sequences, interference diversity is achieved, and the data transmission for a user in a given cell would observe, over a sufficiently long time period, the average interference from the data transmissions for other users in other cells.

The inter-cell interference can vary significantly from subband to subband at any given moment. To account for the variation in interference across the subbands, a margin is typically used in the selection of a data rate for a data transmission. A large margin is normally needed to achieve a low packet error rate (PER) for the data transmission if the variability in interference is large. The large margin results in a greater reduction in the data rate for the data transmission, which limits system capacity.

Frequency hopping can average the inter-cell interference and reduce the required margin. Increasing the frequency hopping rate results in better interference averaging and decreases the required margin. Fast frequency hopping rate is especially beneficial for certain types of transmissions that encode data across multiple frequency hops and which cannot use other techniques, such as automatic request for retransmission (ARQ), to mitigate the deleterious effects of interference.

Multi-Carrier Code Division Multiple Access (MC-CDMA) system with an FH-OFDMA uplink is a communication system based on a combination of CDMA scheme and orthogonal frequency division multiplexing (OFDM) signaling. MC-CDMA is an effective transmission technique on the downlink, as the orthogonality between multiplexed signals can still be preserved even after going through a multi-path channel (assuming accurate time and frequency synchronization between users and a base station), thereby allowing reliable separation of the multiplexed signals at the receiver.

On the other hand, MC-CDMA hasn't been as successful as a multiple-access technique on the uplink. The uplink transmission is inherently different from the downlink transmission in that transmitted signals from different users are affected by different channels. Due to the nature of multiplexing and sensitivity to channel estimation error of MC-CDMA, a disproportionate amount of system resource must be set aside for channel estimation in order for this technique to work on the uplink. Furthermore, synchronization on the uplink is a more complex problem since users see different channels, Doppler shifts, and are often at different distances from the base station.

However, a careful application of MC-CDMA as a multiplexing technique in the context of an FH-OFDMA uplink can result in significant resource utilization improvement, especially in terms of bandwidth utilization for low-spectral efficiency transmission.

In FH-OFDMA a user on the uplink is assigned a subset of sub-carriers and hops over time. Hopping helps improve frequency diversity and interference averaging over time. In an embodiment, sub-carriers on the uplink are divided into non-overlapping groups and each group hops independently. Since channels from consecutive sub-carriers (within a group) are expected to be highly correlated, their channels can be estimated using common pilot symbols, which leads to a significant saving on the pilot overhead (compared to a deployment with random sub-carrier hopping). Furthermore, FH-OFDMA employs a closed-loop uplink time-control mechanism to ensure that all uplink signals arrive within a small time window (i.e., within a cyclic prefix duration), which helps facilitate inter-symbol interference (ISI) and inter-carrier interference (ICI) mitigation.

In an embodiment, FH-OFDMA supports MC-CDMA multiplexing either across different users or across different signals from the same user. FIG. 1 illustrates the concept of MC-CDMA in the context of FH-OFDMA in accordance with an embodiment. The horizontal axis is for OFDM symbols 102. The vertical axis is for sub-carriers 108.

The example assumes 8-carrier group hopping over 8 OFDM symbols. As such, there are 64 modulation symbols in each time-frequency block 106. Hop duration 102 and carrier association 108 are shown for a time-frequency block.

In an embodiment, the time and frequency are contiguous in a time-frequency block. A time-frequency block is a contiguous allocation of OFDM symbols and subcarriers. Alternatively, frequency is not contiguous in a time-frequency block, but frequencies that are part of the same time-frequency block are orthogonal to each other.

Each user is assigned a different set of orthogonal codes to be used in spreading respective data (or pilot) symbols over the allocated time-frequency block. Examples of orthogonal codes include Walsh codes and Gold codes, which are both known in the art.

After spreading, each symbol is mapped to one of the modulation symbols in the assigned time-frequency block. A corresponding OFDMA waveform is then generated based on these symbols (following standard OFDMA waveform generation technique). As can be seen, multiple users are sharing the same time-frequency allocation—a marked distinction from the traditional FH-OFDMA where users are assigned different sets of time-frequency allocation to ensure orthogonality. With proper choices of number of sub-carriers in a group and hop duration, respective channels of different users appear to be constant over certain time-frequency allocation, thereby allowing users to be separated based on the unique spreading signatures/codes assigned to different users.

MC-CDMA signals from different users are multiplexed over the same time-frequency allocation. A respective channel from each user is expected to be constant over each time-frequency allocation, thereby allowing separation at the receiver.

This technique is particularly effective in multiplexing low-spectral efficiency transmissions from different users (e.g., pilot symbols, ACK/NACK symbols, etc.) over the same time-frequency allocation on the uplink. Furthermore, this technique can also be used to help alleviate link budget constraint in certain scenarios.

As an example, a one-bit transmission (e.g., a pilot or ACK/NACK symbol) on the uplink is considered. In order to meet the performance requirement, a certain amount of received SNR must be achieved. A user can either transmit the bit over one transmission at a very high power or transmit at a lower power over several transmissions (e.g., through repetition). The former technique results in high bandwidth efficiency (i.e., only one transmission is required) but may suffer from link budget constraint and, worse yet, from poor performance due to lack of frequency/interference diversity. The alternative approach is to transmit this one bit over several transmissions. To improve frequency/interference diversity each transmission may take place over different frequency and/or time instants. This approach will likely result in more reliable detection at the receiver, but this is at the expense of larger bandwidth overhead and possibly longer transmission time. Longer transmission time of an ACK/NACK bit results in less processing time at the transmitter, especially in a system where H-ARQ is used.

A compromise is to use a transmission technique that is able to garner sufficient amount of frequency/interference diversity while still using reasonable amount of bandwidth. A structure with consecutive carrier group hopping considered previously can be used. In this setting, a user transmits the one-bit quantity over multiple time-frequency blocks in order collect frequency/interference diversity. Furthermore, multiple users are orthogonally multiplexed over a particular time-frequency block to minimize the overall bandwidth consumption. To see this latter point, consider a scenario where a user transmits the one-bit quantity over M transmissions. Assume that N transmissions fall within a particular time-frequency block (i.e., a user transmits over a total of M/N blocks). As such, a user requires N modulation symbols from each block. Assuming that there are a total of K modulation symbols per time-frequency block, each block can then support at most K/N users. Clearly, if the channel remains fairly constant (in both time and frequency) over each time-frequency block, one can readily apply the MC-CDMA multiplexing technique. Towards that end, each user is assigned one of the orthogonal code sequences to modulate a respective data symbol. Orthogonally-spread symbols are then put on appropriate sub-carriers from which an OFDM waveform can be generated.

By assigning an orthogonal code sequence to each user, up to K users can be multiplexed in each time-frequency block while still being able to collect the same amount of energy (after despreading). In addition, since each user is now transmitting over the entire time-frequency block, a saving on the link budget is an immediate byproduct. The link budget saving comes primarily from the fact that each user is transmitting over a longer duration.

This transmission technique can also be generalized to work in a setting where users are transmitting more than just one bit each. In particular, it is always possible to modify the transmission of each user such that multiple users can be multiplexed over each time-frequency block (i.e., through a deliberate spreading). The true bandwidth saving, however, really comes when repetition code (which is a form of spreading) is inherent to the transmission.

In an FH-OFDMA setting, a repetition code is also useful as a means to alleviate link budget constraint. For instance, due to a link budget limitation a user may not be able to meet the received SNR requirement when transmitting a coded symbol over one transmission. One way of getting around this is to transmit each coded symbol over multiple transmissions, each with lower power, at different time instants (i.e., through repetitions). Clearly, by applying the proposed user multiplexing technique, the desired result can be achieved while limiting the bandwidth overhead to a minimum.

Figure 2:
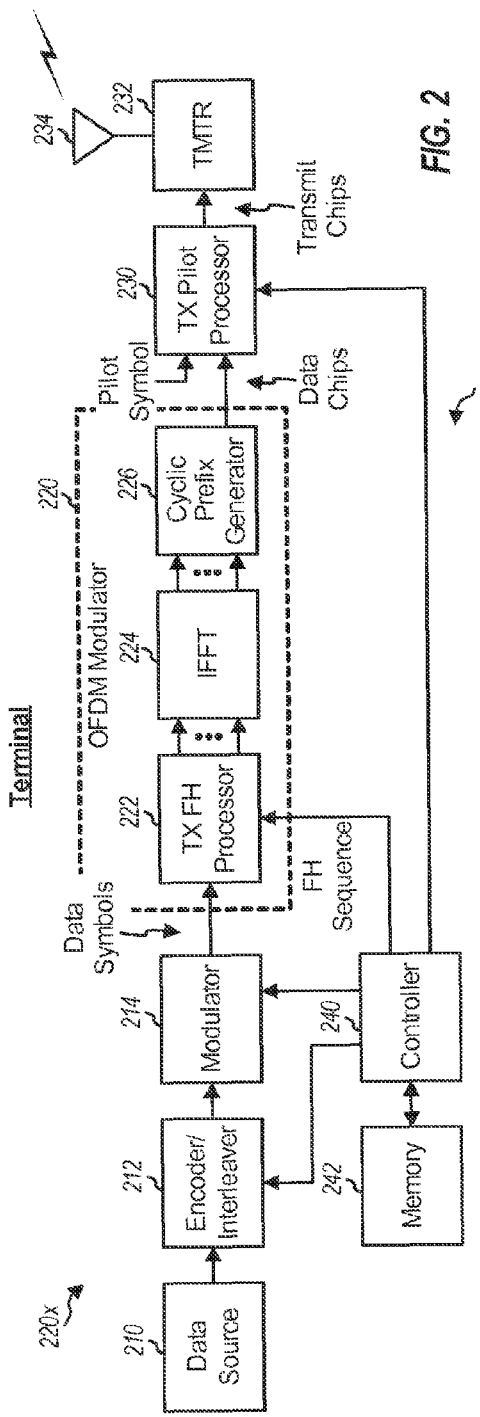
FIG. 2 shows a block diagram of a terminal in accordance with an embodiment.

FIG. 2 shows a block diagram of an embodiment of a terminal 220x, which is one of the terminals in OFDMA system 200. For simplicity, only the transmitter portion of terminal 220x is shown in FIG. 2.

Within terminal 220x, an encoder/interleaver 212 receives traffic data from a data source 210 and possibly control data and other data from a controller 240. Encoder/interleaver 212 formats, encodes, and interleaves the received data to provide coded data. A modulator 214 then modulates the coded data in accordance with one or more modulation schemes (e.g., QPSK, M-PSK, M-QAM, and so on) to provide modulation symbols (or simply, "data symbols"). Each modulation symbol is a complex value for a specific point in a signal constellation for the modulation scheme used for that modulation symbol.

An OFDM modulator 220 performs frequency hopping and OFDM processing for the data symbols. Within OFDM modulator 220, a TX FH processor 222 receives the data symbols and provides these data symbols on the proper subbands determined by an FH sequence for a traffic channel assigned to terminal 220x. This FH sequence indicates the specific subband to use in each hop period and is provided by controller 240. The TX FH processor 222 provides data symbols. The data symbols dynamically hop from subband to subband in a pseudo-random manner determined by the FH sequence. For each OFDM symbol period, TX FH processor 222 provides N "transmit" symbols for the N subbands. These N transmit symbols are composed of one data symbol for the subband used for data transmission (if data is being transmitted) and a signal value of zero for each subband not used for data transmission.

An inverse fast Fourier transform (IFFT) unit 224 receives the N transmit symbols for each OFDM symbol period. IFFT unit 224 then transforms the N transmit symbols to the time domain using an N-point inverse FFT to obtain a "transformed" symbol that contains N time-domain "data" chips. Each data chip is a complex value to be transmitted in one chip period. (The chip rate is related to the overall bandwidth of the system.) A cyclic prefix generator 226 receives the N data chips for each transformed symbol and repeats a portion of the transformed symbol to form an OFDM symbol that contains $N+C_P$ data chips, where $C_P$ is the number of data chips being repeated. The repeated portion is often referred to as a cyclic prefix and is used to combat inter-symbol interference (ISI) caused by frequency selective fading. An OFDM symbol period corresponds to the duration of one OFDM symbol, which is $N+C_P$ chip periods. Cyclic prefix generator 226 provides a stream of data chips for a stream of OFDM symbols.

A transmit (TX) pilot processor 230 receives the stream of data chips and at least one pilot symbol. TX pilot processor 230 generates a narrowband pilot. TX pilot processor 230 provides a stream of "transmit" chips. A transmitter unit (TMTR) 232 processes the stream of transmit chips to obtain a modulated signal, which is transmitted from an antenna 234 to the base station.

Figure 3:
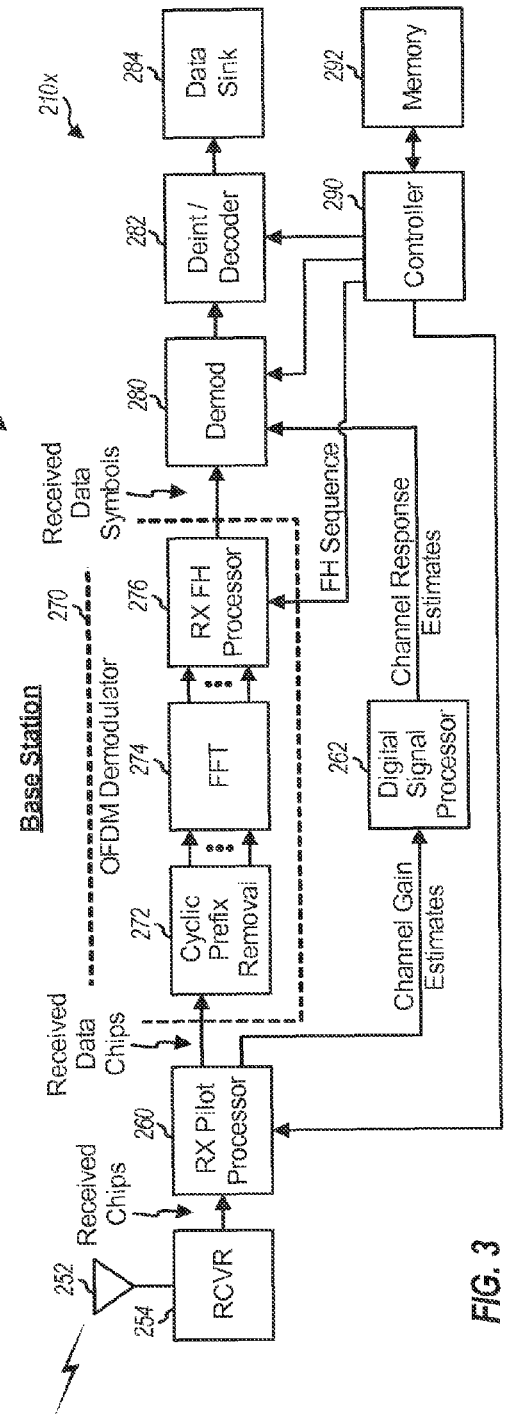
FIG. 3 shows a block diagram of a base station in accordance with an embodiment.

FIG. 3 shows a block diagram of an embodiment of a base station 210x, which is one of the base stations in OFDMA system 200. For simplicity, only the receiver portion of base station 210x is shown in FIG. 3.

The modulated signal transmitted by terminal 220x is received by an antenna 252. The received signal from antenna 252 is provided to and processed by a receiver unit (RCVR) 254 to provide samples. Receiver unit 254 may further perform sample rate conversion (from the receiver sampling rate to the chip rate), frequency/phase correction, and other pre-processing on the samples. Receiver unit 254 provides a stream of "received" chips.

A receive (RX) pilot processor 260 receives and processes the stream of received chips to recover the narrowband pilot and the data chips transmitted by terminal 220x. Several designs for RX pilot processor 260 are described below. RX pilot processor 260 provides a stream of received data chips to an OFDM demodulator 270 and channel gain estimates to a digital signal processor (DSP) 262. DSP 262 processes the channel gain estimates to obtain channel response estimates used for data demodulation, as described below.

Within OFDM demodulator 270, a cyclic prefix removal unit 272 receives the stream of received data chips and removes the cyclic prefix appended to each received OFDM symbol to obtain a received transformed symbol. An FFT unit 274 then transforms each received transformed symbol to the frequency domain using an N-point FFT to obtain N received symbols for the N subbands. An RX FH processor 276 obtains the N received symbols for each OFDM symbol period and provides the received symbol from the proper subband as the received data symbol for that OFDM symbol period. The specific subband from which to obtain the received data symbol in each OFDM symbol period is determined by the FH sequence for the traffic channel assigned to terminal 220x. This FH sequence is provided by a controller 290. Since the data transmission by terminal 220x dynamically hops from subband to subband, RX FH processor 276 operates in unison with TX FH processor 222 in terminal 220x and provides the received data symbols from the proper subbands. The FH sequence used by RX FH processor 276 at base station 210x is the same as the FH sequence used by TX FH processor 222 at terminal 220x. Moreover, the FH sequences at base station 210x and terminal 220x are synchronized. RX FH processor 276 provides a stream of received data symbols to a demodulator 280.

Demodulator 280 receives and coherently demodulates the received data symbols with the channel response estimates from DSP 262 to obtain recovered data symbols. The channel response estimates are for the subbands used for data transmission. Demodulator 280 further demaps the recovered data symbols to obtain demodulated data. A deinterleaver/decoder 282 then deinterleaves and decodes the demodulated data to provide decoded data, which may be provided to a data sink 284 for storage. In general, the processing by the units in base station 210x is complementary to the processing performed by the corresponding units in terminal 420x.

Controllers 240 and 290 direct operation at terminal 220x and base station 210x, respectively. Memory units 242 and 292 provide storage for program codes and data used by controllers 240 and 290, respectively. Controllers 240 and 290 may also perform pilot-related processing. For example, controllers 240 and 290 may determine the time intervals when a narrowband pilot for terminal 220x should be transmitted and received, respectively.

For clarity, FIGS. 2 and 3 show transmission and reception, respectively, of pilot and data on the reverse link. Similar or different processing may be performed for pilot and data transmission on the forward link.

The techniques described herein may be used for a frequency hopping OFDMA system as well as other wireless multi-carrier communication systems. For example, these techniques may be used for systems that employ other multi-carrier modulation techniques such as discrete multi-tone (DMT).

The techniques described herein may be used for efficient narrowband uplink pilot transmissions in a Time Division Duplexing (TDD) deployment. The saving is in both system bandwidth and link budget for each user. For example, given three users, each transmitting a symbol over three time slots, each user transmits its symbol at ⅓ transmission power over three time slots.

The techniques described herein may be implemented by various means at the transmitter and the receiver. The pilot and data processing at the transmitter and receiver may be performed in hardware, software, or a combination thereof. For a hardware implementation, the processing units (e.g., TX pilot processor 230, RX pilot processor 260, DSP 222, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the pilot and data processing at the transmitter and receiver may be implemented with modules (e.g., procedures, functions, and so on) that perform the functions described herein. The software codes may be stored in memory units (e.g., memory units 242 and 292 in FIGS. 2 and 3) and executed by processors (e.g., controllers 240 and 290). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing wireless transmissions from a user device over a plurality of sub-carriers, comprising:

utilizing, at the user device, one non-overlapping group of the sub-carriers over which the user device is to transmit;

utilizing, at the user device, a user device specific set of orthogonal codes;

spreading symbols using the user device specific set of orthogonal codes to form user device orthogonally spread symbols; and providing the user device orthogonally spread symbols from the user device by frequency hopping over time within the one non-overlapping group of the sub-carriers over which the user device transmits, wherein the user device is one of multiple user devices sharing a single time-frequency allocation of the one non-overlapping group of the sub-carriers, and wherein the multiple user devices are each configured to transmit respective user device orthogonally spread symbols within the single time-frequency allocation of the one non-overlapping group of the sub-carriers.

2. The method of claim 1, wherein the providing the user device orthogonally spread symbols comprises providing common pilot symbols from the user device over time within the one non-overlapping group of the sub-carriers over which the user device transmits for use in channel estimation.

3. The method of claim 1, wherein the providing the user device orthogonally spread symbols comprises spreading the symbols between frequencies over time using the user device specific set of orthogonal codes.

4. A user device configured to provide wireless transmissions over a plurality of sub-carriers, comprising:
 a controller configured to utilize one non-overlapping group of the sub-carriers over which the user device is to transmit, to utilize a user device specific set of orthogonal codes, and to spread symbols using the user device specific set of orthogonal codes to form user device orthogonally spread symbols; and
 a transmitter connected to the controller and configured to provide the user device orthogonally spread symbols by frequency hopping over time within the one non-overlapping group of the sub-carriers over which the user device transmits,
 wherein the user device is one of multiple user devices sharing a single time-frequency allocation of the one non-overlapping group of the sub-carriers, and wherein the multiple user devices are each configured to transmit respective user device orthogonally spread symbols within the single time-frequency allocation of the one non-overlapping group of the sub-carriers.

5. The user device of claim 4, wherein the transmitter is further configured to provide common pilot symbols from the user device over time within the one non-overlapping group of the sub-carriers over which the user device transmits for use in channel estimation.

6. The user device of claim 4, wherein the transmitter is further configured to spread the symbols between frequencies over time using the user device specific set of orthogonal codes.

7. A user device configured to provide wireless transmissions over a plurality of sub-carriers, comprising:
 means for utilizing, at the user device, one non-overlapping group of the sub-carriers over which the user device is to transmit, utilizing, at the user device, a user device specific set of orthogonal codes, and spreading symbols using the user device specific set of orthogonal codes to form user device orthogonally spread symbols; and
 means for providing the user device orthogonally spread symbols from the user device by frequency hopping over time within the one non-overlapping group of the sub-carriers over which the user device transmits,
 wherein the user device is one of multiple user devices sharing a single time-frequency allocation of the one non-overlapping group of the sub-carriers, and wherein the multiple user devices are each configured to transmit respective user device orthogonally spread symbols within the single time-frequency allocation of the one non-overlapping group of the sub-carriers.

8. The user device of claim 7, wherein the means for providing the user device orthogonally spread symbols comprise means for providing common pilot symbols from the user device over time within the one non-overlapping group of the sub-carriers over which the user device transmits for use in channel estimation.

9. The user device of claim 7, wherein the means for providing the user device orthogonally spread symbols comprise means for spreading the symbols between frequencies over time using the user device specific set of orthogonal codes.

10. A non-transitory computer readable medium embodying code executable by a processor for implementing a method for providing wireless transmissions from a user device over a plurality of sub-carriers, the method comprising:
 utilizing, at the user device, one non-overlapping group of the sub-carriers over which the user device is to transmit;
 utilizing, at the user device, a user device specific set of orthogonal codes;
 spreading symbols using the user device specific set of orthogonal codes to form user device orthogonally spread symbols; and
 providing the user device orthogonally spread symbols from the user device by frequency hopping over time within the one non-overlapping group of the sub-carriers over which the user device transmits,
 wherein the user device is one of multiple user devices sharing a single time-frequency allocation of the one non-overlapping group of the sub-carriers, and wherein the multiple user devices are each configured to transmit respective user device orthogonally spread symbols within the single time-frequency allocation of the one non-overlapping group of the sub-carriers.

11. The non-transitory computer readable medium of claim 10, wherein providing the user device orthogonally spread symbols comprises providing common pilot symbols from the user device over time within the one non-overlapping group of the sub-carriers over which the user device transmits for use in channel estimation.

12. The non-transitory computer readable medium of claim 10, wherein the providing the user device orthogonally spread symbols further comprises spreading the symbols between frequencies over time using the user device specific set of orthogonal codes.

13. A user device configured to provide wireless transmissions over a plurality of sub-carriers, comprising:
 a controller configured to utilize one non-overlapping group of the sub-carriers over which the user device is to transmit, said one non-overlapping group of the sub-carriers not overlapping with groups utilized by other user devices in a region wherein the user device transmits, wherein multiple user devices are sharing one time-frequency allocation of the one non-overlapping group of the sub-carriers;
 a modulator coupled to the controller and configured to process symbols utilizing a user device specific set of orthogonal codes by spreading the symbols using the user device specific set of orthogonal codes to form user device orthogonally spread symbols for transmission over the one non-overlapping group of the sub-carriers;
 a transmit processor configured to receive the user device orthogonally spread symbols from the modulator and provide N transmit symbols for N sub-carriers, where N is an integer greater than one; and
 a transmitter configured to transmit the N transmit symbols over the N sub-carriers,
 wherein the user device is one of the multiple user devices each configured to transmit respective user device orthogonally spread symbols within a single time-frequency allocation of the N sub-carriers.

14. The user device of claim 13, wherein the modulator comprises a transform unit configured to transform the N transmit symbols into time domain.

15. The user device of claim 14, wherein the transform unit provides a number of transformed symbols, and the modulator further comprises a cyclic prefix generator configured to repeat a portion of each transform symbol to form a symbol comprising N plus a number of data chips being repeated.

16. The user device of claim 15, wherein the transmit processor comprises a transmit pilot processor configured to receive a stream of data chips produced using the cyclic prefix generator and at least one pilot symbol and generate a narrowband pilot signal.

17. The user device of claim 13, wherein the modulator is further configured to spread the symbols between frequencies over time using the user device set of orthogonal codes.

18. A method for providing, from a user device, wireless transmissions over a plurality of sub-carriers, comprising:
   utilizing one non-overlapping group of the sub-carriers over which the user device is to transmit, said one non-overlapping group of the sub-carriers not overlapping with groups utilized by other user devices in a region wherein the user device transmits, wherein multiple user devices are sharing one time-frequency allocation of the one non-overlapping group of the sub-carriers;
   processing symbols utilizing a user device specific set of orthogonal codes by spreading the symbols using the user device specific set of orthogonal codes to form user device orthogonally spread symbols for transmission over the one non-overlapping group of the sub-carriers;
   providing N transmit symbols for N sub-carriers, where N is an integer greater than one; and
   transmitting the N transmit symbols over the N sub-carriers,
   wherein the user device is one of the multiple user devices each configured to transmit respective user device orthogonally spread symbols within a single time-frequency allocation of the N sub-carriers.

19. The method of claim 18, further comprising transforming the N transmit symbols into time domain.

20. The method of claim 19, wherein the transforming the N transmit symbols provides a number of transformed symbols, the method further comprising repeating a portion of each transform symbol to form a symbol comprising N plus a number of data chips being repeated.

21. The method of claim 20, further comprising receiving a stream of data chips produced by the repeating and at least one pilot symbol and generating a narrowband pilot signal.

22. The method of claim 18, further comprising spreading the symbols between frequencies over time using the user device set of orthogonal codes.

23. A user device configured to provide wireless transmissions over a plurality of sub-carriers, comprising:
   means for utilizing one non-overlapping group of the sub-carriers over which the user device is to transmit, said one non-overlapping group of the sub-carriers not overlapping with groups utilized by other user devices in a region wherein the user device transmits, wherein multiple user devices are sharing one time-frequency allocation of the one non-overlapping group of the sub-carriers;
   means for processing symbols utilizing a user device specific set of orthogonal codes by spreading the symbols using the user device specific set of orthogonal codes to form user device orthogonally spread symbols for transmission over the one non-overlapping group of the sub-carriers;
   means for providing N transmit symbols for N sub-carriers, where N is an integer greater than one; and
   means for transmitting the N transmit symbols over the N sub-carriers,
   wherein the user device is one of the multiple user devices each configured to transmit respective user device orthogonally spread symbols within a single time-frequency allocation of the N sub-carriers.

24. The user device of claim 23, further comprising means for transforming the N transmit symbols into time domain.

25. The user device of claim 24, wherein the means for transforming the N transmit symbols provides a number of transformed symbols, the user device further comprising means for repeating a portion of each transform symbol to form a symbol comprising N plus a number of data chips being repeated.

26. The user device of claim 25, further comprising means for receiving a stream of data chips from the means for repeating and at least one pilot symbol and generating a narrowband pilot signal.

27. The user device of claim 23, wherein the means for processing comprises means for spreading the symbols between frequencies over time using the user device set of orthogonal codes.

28. A non-transitory computer readable medium embodying code executable by a processor for implementing a method for providing, from a user device, wireless transmissions over a plurality of sub-carriers, the method comprising:
   utilizing one non-overlapping group of the sub-carriers over which the user device is to transmit, said one non-overlapping group of the sub-carriers not overlapping with groups utilized by other user devices in a region wherein the user device transmits, wherein multiple user devices are sharing one time-frequency allocation of the one non-overlapping group of the sub-carriers;
   processing symbols utilizing a user device specific set of orthogonal codes by spreading the symbols using the user device specific set of orthogonal codes to form user device orthogonally spread symbols for transmission over the one non-overlapping group of the sub-carriers;
   providing N transmit symbols for N sub-carriers, where N is an integer greater than one; and
   transmitting the N transmit symbols over the N sub-carriers,
   wherein the user device is one of the multiple user devices each configured to transmit respective user device orthogonally spread symbols within a single time-frequency allocation of the N sub-carriers.

29. The non-transitory computer readable medium of claim 28, the method further comprising transforming the N transmit symbols into time domain.

30. The non-transitory computer readable medium of claim 29, wherein the transforming the N transmit symbols provides a number of transformed symbols, the method further comprising repeating a portion of each transform symbol to form a symbol comprising N plus a number of data chips being repeated.

31. The non-transitory computer readable medium of claim 30, the method further comprising receiving a stream of data chips produced by the repeating and at least one pilot symbol and generating a narrowband pilot signal.

32. The non-transitory computer readable medium of claim 28, the method further comprising spreading the symbols between frequencies over time using the user device set of orthogonal codes.

* * * * *